United States Patent
Ferraro, Jr. et al.

(10) Patent No.: US 11,219,207 B1
(45) Date of Patent: Jan. 11, 2022

(54) POLYMERIC COMPOSITIONS FOR RODENTICIDES

(71) Applicant: Scientific Pest Solutions, LLC, Narragansett, RI (US)

(72) Inventors: Robert R. Ferraro, Jr., Narragansett, RI (US); Eric Spicer, Wickford, RI (US)

(73) Assignee: Scientific Pest Solutions, LLC, Narragansett, RI (US)

( * ) Notice: Subject to any disclaimer, the term of this patent is extended or adjusted under 35 U.S.C. 154(b) by 0 days.

(21) Appl. No.: 16/367,182

(22) Filed: Mar. 27, 2019

Related U.S. Application Data

(60) Provisional application No. 62/649,014, filed on Mar. 28, 2018.

(51) Int. Cl.
   *A01N 25/00* (2006.01)
   *A01N 37/06* (2006.01)

(52) U.S. Cl.
   CPC .......... *A01N 25/004* (2013.01); *A01N 37/06* (2013.01)

(58) Field of Classification Search
   None
   See application file for complete search history.

(56) References Cited

U.S. PATENT DOCUMENTS

| | | | | |
|---|---|---|---|---|
| 4,983,390 A * | 1/1991 | Levy | ...................... | A01N 25/10 424/404 |
| 5,720,951 A * | 2/1998 | Baker | .................. | A01N 25/004 424/84 |
| 8,574,638 B1 | 11/2013 | Perry | | |
| 10,105,456 B2 | 10/2018 | Harmsen et al. | | |
| 2010/0037901 A1 * | 2/2010 | Rousseau | ................ | A61F 5/566 128/848 |
| 2015/0328346 A1 | 11/2015 | Harmsen et al. | | |
| 2016/0150775 A1 * | 6/2016 | Berengardt | .......... | A01N 25/006 424/489 |
| 2018/0206483 A1 * | 7/2018 | Sillion | ................. | A01N 25/004 |

FOREIGN PATENT DOCUMENTS

| | | |
|---|---|---|
| BE | 1000534 A5 | 1/1989 |
| WO | WO 2017/009342 A1 | 1/2017 |

OTHER PUBLICATIONS

[No Author Listed], RatX Product Information. 16 pages.
Harrison, What is normal animal behavior? Department of Medicine, Vanderbilt University Medical Center. 2012. Presentation. 42 pages.
Horn et al., Why can't rodents vomit? A comparative behavioral, anatomical, and physiological study. PLoS One. Apr. 10, 2013;8(4):e60537. doi: 10.1371/journal.pone.0060537.Print 2013.
Zhu et al., Polyacrylate/nanosilica causes pleural and pericardial effusion, and pulmonary fibrosis and granuloma in rats similar to those observed in exposed workers. Int J Nanomedicine. Apr. 18, 2016; 11:1593-605. doi: 10.2147/IJN.S102020. eCollection 2016.

* cited by examiner

*Primary Examiner* — Sin J Lee
(74) *Attorney, Agent, or Firm* — Wolf, Greenfield & Sacks, P.C.

(57) ABSTRACT

Compositions related to polymeric rodenticides, methods of making, and methods of use related to rodenticides comprising polymers are generally described. Rodenticides described in some aspects comprise an active ingredient, an attractant, and a binder. The active ingredient may comprise a polymer, such as polyacrylate, which expands upon exposure to water. The rodenticide composition may contain the active ingredient in an amount of 50-80 wt. % versus the total weight of the composition. The attractant attracts the rodent to the composition, while the binder adheres the composition together. Upon consumption of the rodenticide composition by a rodent, the active ingredient expands in the stomach (e.g., upon exposure to water). The expansion of the active ingredient causes the rodent to feel satiated and not search for water and food, ultimately leading to the death of the rodent, often within two days. Certain embodiments described herein are also related to methods of making such compositions (e.g., where the composition is dry-extruded into a pellet), methods of using such compositions, kits containing such compositions, or the like.

10 Claims, No Drawings

POLYMERIC COMPOSITIONS FOR RODENTICIDES

CROSS REFERENCE TO RELATED APPLICATION

This application claims the benefit of U.S. Provisional Application No. 62/649,014, filed Mar. 28, 2018, which is hereby incorporated by reference in its entirety.

TECHNICAL FIELD

Compositions, methods of making, and methods of use related to rodenticides comprising polymers are generally described.

BACKGROUND

Pesticides that contain poison can be harmful to human and animals that unknowingly consume them. Conventional rodenticides can result in unintentional illness or death of wild animals such as birds, squirrels, woodchucks, chipmunks, porcupines, and beavers, or household pets such as dogs and cats, when consumed. Similarly, rodenticides can be toxic and can result in damaged crops or ecological damage. Other methods of killing rodents, including traditional mousetraps or sticky traps, are often inefficient. A need therefore exists for a rodenticide that can be consumed by rodents, but would not be harmful to humans and/or non-rodent pets or wildlife.

SUMMARY

Compositions, methods of making, and methods of use related to rodenticides comprising polymers are generally described.

In certain embodiments, a rodenticide composition is described, wherein the rodenticide composition comprises an active ingredient in an amount ranging from at least 50 wt. % to less than or equal to 80 wt. % versus the total weight of the composition, wherein the active ingredient expands by at least its original size upon exposure to water, and an attractant in an amount ranging from at least 20 wt. % to less than or equal to 50 wt. % versus the total weight of the composition.

Some embodiments are related to a rodenticide composition comprising a dry-extruded pellet comprising acrylate in an amount ranging from at least 66 wt. % to less than or equal to 80 wt. % versus the total weight of the composition, an attractant in an amount ranging from at least 20 wt. % to less than or equal to 30 wt. % versus the total weight of the composition, and ethyl cellulose in amount ranging from at least 0.01 wt. % to less than or equal to 1 wt. % versus the total weight of the composition.

According to certain embodiments, methods for using a rodenticide composition are described, wherein the method comprises placing a rodenticide composition in a location suitable for consumption by a rodent, wherein the rodenticide composition is lethal to the rodent after consumption, and wherein the rodenticide composition comprises an active ingredient in an amount ranging from at least 50 wt. % to less than or equal to 80 wt. % versus the total weight of the composition, wherein the active ingredient expands by at least 100 vol. % upon exposure to water, and an attractant in an amount ranging from at least 20 wt. % to less than or equal to 50 wt. % versus the total weight of the composition.

In some embodiments, a method for making a rodenticide composition is described, wherein the method comprises dry-extruding a composition comprising an active ingredient in an amount ranging from at least 50 wt. % to less than or equal to 80 wt. % versus the total weight of the composition, wherein the active ingredient expands by at least 100 vol. % upon exposure to water, and an attractant in an amount ranging from at least 20 wt. % to less than or equal to 50 wt. % versus the total weight of the composition.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

DETAILED DESCRIPTION

Compositions, methods of making, and methods of use related to rodenticides comprising polymers are generally described. Rodenticides described in some aspects comprise an active ingredient, an attractant, and a binder. The active ingredient may comprise a polymer, such as polyacrylate, which expands upon exposure to water. The rodenticide composition may contain the active ingredient in an amount of 50-80 wt. % versus the total weight of the composition. The attractant attracts the rodent to the composition, while the binder adheres the composition together. Upon consumption of the rodenticide composition by a rodent, the active ingredient expands in the stomach (e.g., upon exposure to water). The expansion of the active ingredient causes the rodent to feel satiated and not search for water and food, ultimately leading to the death of the rodent. Death of the rodent may occur within five days after consumption, and often within two days. Certain embodiments described herein are also related to methods of making such compositions (e.g., where the composition is dry-extruded into a pellet), methods of using such compositions, kits containing such compositions, or the like.

Without wishing to be bound by any theory, it is believed that rats, mice, and other rodents are unable to vomit and cannot produce an emetic reflex that humans or larger animals (e.g., dogs) can. More specifically, rodents have a powerful muscle barrier between the stomach and the esophagus, but lack sufficient esophageal muscle strength to overcome that barrier by force, which is necessary for vomiting. Thus, in certain embodiments, rodents such as rats or mice consume compositions such as those discussed herein, which mislead the rodents into not searching for any food or water, leading to their death. In contrast, humans or other animals such as dogs may vomit such compositions, thereby preventing accidental poisoning.

Thus, one set of embodiments is generally directed to compositions comprising an active ingredient that expands (e.g., upon exposure to water or gastric acids). In some cases, the volumetric expansion may be at least 100%, 200%, 400%, or more, relative to the original size of the composition. The composition may comprise a polymer, such as polyacrylate or polyacrylamide, that is able to expand upon exposure to water.

According to certain embodiments, the composition comprises an active ingredient in an amount ranging from at least 50 wt. % to less than or equal to 80 wt. % versus the total weight of the composition. The active ingredient may be one that is able to kill a rodent (e.g., by expanding to at least its original size or volume upon exposure to water).

In some cases, a relatively large amount of the composition may comprise an active ingredient (e.g., at least 50 wt. %, at least 60 wt. %, at least 66 wt. %, or at least 70 wt. % of the composition may comprise active ingredient). Without wishing to be bound by any theory, it is believed that such high concentrations of active ingredient can kill rodents more rapidly, relative to lower concentrations. For instance, as discussed in the examples below, rodents are quite intelligent, and will quickly learn to not eat food that is questionable. Accordingly, a rodent who fails to eat sufficient amounts of an active ingredient may survive the effects of the expansion of the active ingredient within its stomach, and thereafter may avoid consuming any more of the composition. Accordingly, there may only be one chance at killing the rodent: by making sure the rodent consumes sufficient amounts of the active ingredient with the first exposure.

Compositions (including some of those described in the prior art) containing lower concentrations of active ingredient (for example, 50 wt. % or less of the active ingredient) may not produce the desired effect of killing rodents, as the rodents do not consume sufficient amounts of active ingredient, and then subsequently learn to avoid consuming any more of the active ingredient, meaning that the composition is a failure.

Conversely, in some embodiments, too much active ingredient may be insufficiently appetizing to a rodent (e.g., since the active ingredient may be one that is not present in nature or is generally recognizable as food). Thus, too much active ingredient within a composition may mean too little attractant to convince a rodent to consume the composition. Accordingly, certain embodiments of the invention are generally directed to compositions comprising active ingredients in amounts ranging from at least 50 wt. % to less than or equal to 80 wt. % versus the total weight of the composition. However, it should be understood that not all embodiments of the present invention are limited to such amounts.

According to some aspects, the composition may include any one or more of a variety of active ingredients. In certain embodiments, the active ingredient is a component of the rodenticide composition that ultimately causes the death of the rodent.

In some embodiments, the active ingredient comprises acrylate, including acrylate salts (e.g., sodium acrylate), acrylate esters, conjugate bases of acrylate, or the like. In certain embodiments, the active ingredient comprises a polyacrylate. The polyacrylate may have any of a variety of suitable average molecular weights. For example, in some cases, the polyacrylate may have an average molecular weight of at least 2,000 g/mol, at least 5,000 g/mol, at least 10,000 g/mol, at least 20,000 g/mol, at least 50,000 g/mol, at least 100,000 g/mol, at least 150,000 g/mol, at least 200,000 g/mol, or at least 250,000 g/mol. In certain embodiments, the polyacrylate may have an average molecular weight of less than 300,000 g/mol, less than 250,000 g/mol, less than 200,000 g/mol, less than 150,000 g/mol, less than 100,000 g/mol, less than 50,000 g/mol, less than 20,000 g/mol, less than 10,000 g/mol, or less than 5,000 g/mol. Combinations of these ranges are also possible (e.g., at least 50,000 g/mol and less than 200,000 g/mol, at least 100,000 g/mol and less than 150,000 g/mol). Other ranges are also possible.

According to certain embodiments, the active ingredient comprises an acrylamide, including acrylamide salts, acrylamide esters, conjugate bases of acrylamide, or the like. In certain embodiments, the active ingredient comprises a polyacrylamide.

The polyacrylamide may have any of a variety of suitable average molecular weights. For example, in some cases, the polyacrylamide may have an average molecular weight of at least 2,000 g/mol, at least 5,000 g/mol, at least 10,000 g/mol, at least 20,000 g/mol, at least 50,000 g/mol, at least 100,000 g/mol, at least 150,000 g/mol at least 200,000 g/mol, or at least 250,000 g/mol. In certain embodiments, the polyacrylamide may have an average molecular weight of less than 300,000 g/mol, less than 250,000 g/mol, less than 200,000 g/mol, less than 150,000 g/mol, less than 100,000 g/mol, less than 50,000 g/mol, less than 20,000 g/mol, less than 10,000 g/mol, or less than 5,000 g/mol. Combinations of these ranges are also possible (e.g., at least 50,000 g/mol and less than 200,000 g/mol, at least 100,000 g/mol and less than 150,000 g/mol). Other ranges are also possible.

The composition may comprise the active ingredient in any of a variety of suitable amounts. For example, the rodenticide composition may comprise the active ingredient in an amount of at least 50 wt. %, at least 55 wt. %, at least 60 wt. %, at least 65 wt. %, at least 70 wt. %, or at least 75 wt. % versus the total weight of the composition. In some embodiments, the rodenticide composition comprises the active ingredient in an amount of less than or equal to 80 wt. %, less than or equal to 75 wt. %, less than or equal to 70 wt. %, less than or equal to 65 wt. %, less than or equal to 60 wt. %, or less than or equal to 55 wt. % versus the total weight of the composition. Combinations of these ranges are also possible. For example, in certain embodiments, the rodenticide composition comprises the active ingredient in an amount ranging from at least 50 wt. % to less than or equal to 80 wt. % versus the total weight of the composition. According to certain embodiments, the rodenticide composition comprises the active ingredient in an amount ranging from at least 70 wt. % to less than or equal to 80 wt. % versus the total weight of the composition. Other ranges are also possible.

In some embodiments, the rodenticide composition comprises the active ingredient in an amount of 66 wt. % versus the total weight of the composition. In some cases, the rodenticide composition comprises the active ingredient in an amount of 70 wt. % versus the total weight of the composition. According to certain embodiments, the rodenticide composition comprises the active ingredient in an amount of 80 wt. % versus the total weight of the composition.

The active ingredient (e.g., polyacrylate) can absorb water in some cases. The active ingredient may be insoluble in water. In certain cases, the active ingredient can comprise crosslinked monomeric units, and at least a portion of the monomeric units form interactions with water. For example, in some embodiments, the monomeric units form hydrogen bonds with water.

In certain embodiments, polyacrylate, if present, may comprise repeat units of the monomer —$CH_2CH(CO_2)$— upon exposure to water. The monomer may form hydrogen bonds with water, for example, between water (e.g., a hydrogen atom of water) and an oxygen atom of the monomer.

In some embodiments, polyacrylamide, if present, may comprise repeating units of the monomer —$CH_2CH(CONH_2)$— upon exposure to water. The —$CH_2CH(CONH_2)$— monomer may form hydrogen bonds with water, for example, between water (e.g., a hydrogen atom of water) and the nitrogen atom and/or oxygen atom of the monomer.

In certain embodiments, as the active ingredient absorbs water, the volume of the active ingredient expands. The volume of the active ingredient may expand upon exposure to water when the rodent consumes the rodenticide composition and water. These may be consumed in any order. In certain embodiments, the rodent may consume water prior to consuming the rodenticide composition, causing the volume of the active ingredient to expand upon exposure to water already present in the stomach of the rodent. In other embodiments, the rodent may consume water after consuming the rodenticide composition. In addition, the composition may expand upon exposure to gastric acids and/or water present within the stomach, i.e., it is not necessary for the rodent to additionally consume water in order for expansion of the active composition to occur.

The active ingredient may expand any of a variety of suitable amounts. For example, in some embodiments, the active ingredient expands by at least its original size. In certain embodiments, the active ingredient expands by at least 50 vol. %, at least 100 vol. %, at least 150 vol. %, at least 200 vol. %, at least 250 vol. %, at least 300 vol. %, at least 350 vol. %, at least 400 vol. %, or at least 450 vol. %. In some embodiments, the active ingredient expands by less than 500 vol. %, less than 450 vol. %, less than 400 vol. %, less than 350 vol. %, less than 300 vol. %, less than 250 vol. %, less than 200 vol. %, less than 150 vol. %, or less than 100 vol. %. Combinations of these ranges are also possible (e.g., at least 300 vol. % and less than 500 vol. %, at least 350 vol. % and less than 450 vol. %). Other ranges are also possible.

According to certain embodiments, the active ingredient expands by at least 100 vol. %. In some embodiments, the active ingredient expands by at least 400 vol. %. It should be understood that the amount of expansion may occur by different amounts in different rodents (e.g., due to factors such as the amount of water drunk by the rodent) the amount of food (or other substances) present within the stomach, the osmolarity or acidity (pH) of the stomach, the activity of the rodent, the amount of active ingredient consumed by the rodent, or the like.

The composition can also comprises an attractant. In certain embodiments, the attractant attracts a rodent to the rodenticide composition. In some aspects, the rodent may be attracted to the attractant because the attractant is palatable. In some embodiments, the rodenticide composition comprises more than one attractant (e.g., two attractants, three attractants, four attractants, five attractants, etc.). Examples of attractants include, but are not limited to, peanut butter, salt, bonito, mackerel, oyster, lobster, clam, fruit punch, maple, pineapple, apple, berry, berry punch, strawberry, raspberry, fish, rotten fruit, cheese, corn, soy oil, soybean, chicken feed, cracked corn, and distillers grain. Combinations of these and/or other attractants are also possible.

The attractant may be present in any of a variety of suitable amounts. For example, in certain embodiments, the attractant may be present in at least 20 wt. %, at least 25 wt. %, at least 30 wt. %, at least 35 wt. %, at least 40 wt. %, or at least 45 wt. % versus the total weight of the composition. According to certain embodiments, the rodenticide composition comprises the attractant in an amount of less than or equal to 50 wt. %, less than or equal to 45 wt. %, less than or equal to 40 wt. %, less than or equal to 35 wt. %, less than or equal to 30 wt. %, or less than or equal to 25 wt. % versus the total weight of the composition. Combinations of these ranges are also possible. For example, in certain embodiments, the composition comprises the attractant in an amount ranging from at least 20 wt. % to less than or equal to 50 wt. % versus the total weight of the composition. Other ranges are also possible.

As a non-limiting example, the rodenticide composition may comprise the attractant in an amount of 30 wt. % versus the total weight of the composition. As another example, the rodenticide composition comprises the attractant in an amount of 20 wt. % versus the total weight of the composition.

In certain embodiments, the rodenticide composition may comprise a binder. In some embodiments, the binder adheres the composition together, for example, as a pellet or other solid shape. In one embodiment, the binder comprises ethyl cellulose. Other examples of binders include magnesium aluminum silicate, bentonite, polyvinyl alcohol, poly(ethylene glycol), acrylate, paraffin, or the like. In addition, in some cases, no binder may be present.

The binder can be present in any of a variety of suitable amounts. For example, according to some embodiments, the composition comprises the binder in an amount of at least 0.01 wt. %, at least 0.05 wt. %, at least 0.1 wt. %, at least 0.5 wt. %, at least 1 wt. %, at least 2 wt. %, or at least 5 wt. % versus the total weight of the composition. According to certain embodiments, the rodenticide composition comprises the binder in an amount of less than or equal to 10 wt. %, less than or equal to 5 wt. %, less than or equal to 2 wt. %, less than or equal to 1 wt. %, less than or equal to 0.5 wt. %, less than or equal to 0.1 wt. %, or less than or equal to 0.05 wt. % versus the total weight of the composition. Combinations of these ranges are also possible. For example, the rodenticide composition comprises the binder in an amount ranging from at least 0.01 wt. % to less than or equal to 10 wt. % versus the total weight of the composition in one embodiment. According to some embodiments, the rodenticide composition comprises the binder in an amount ranging from at least 0.01 wt. % to less than or equal to 1 wt. % versus the total weight of the composition. Other ranges are also possible. In addition, in some cases, no binder may be present. In certain embodiments, the rodenticide composition comprises the binder in an amount of 0.01 wt. % versus the total weight of the composition.

Thus, as non-limiting examples, in some embodiments, the rodenticide composition comprises an attractant in an amount ranging from at least 20 wt. % to less than or equal to 50 wt. % versus the total weight of the composition, and a binder in an amount ranging from at least 0.01 wt. % to less than or equal to 10 wt. % versus the total weight of the composition. In some embodiments, the composition may comprise acrylate in an amount ranging from at least 70 wt. % to less than or equal to 80 wt. % versus the total weight of the composition, an attractant in an amount of at least 20 wt. % to less than or equal to 30 wt. % versus the total weight of the composition, and ethyl cellulose in an amount ranging from greater than or equal to 0.01 wt. % to less than or equal to 1 wt. % versus the total weight of the composition.

According to some embodiments, methods for making the rodenticide composition are described. In certain cases, the method of making comprises extruding (e.g., dry-extruding) a material to produce a rodenticide composition. The composition may have the form of a pellet, or other shapes.

Compositions such as those described herein may be made by any of a variety of suitable methods. For example, in certain embodiments, a rodenticide composition is made by an extrusion (e.g., dry-extrusion) method. Extrusion is a process used to create an object by forcing a material through a die. The material may be aggregated and/or passed through the die using pressure agglomeration, wherein the material is forced through the die at any of a variety of suitable pressures (e.g., greater than or equal to 15 psi, greater than or equal to 50 psi, greater than or equal to 100 psi, greater than or equal to 500 psi, greater than or equal to 1,000 psi, greater than or equal to 2,000 psi, etc.). The die may have a fixed cross-sectional diameter profile. In some cases, processes involving extrusion methods comprise using an extruder comprising an extrusion chamber to blend (e.g., mix) materials. The extrusion (e.g., dry-extrusion) method may be performed with any of a variety of suitable extruders. For example, the extruder may be a hand or machine powered screw compression extruder, a Chilsonator®, or another dry granulation/roll compactor.

In some embodiments, the extrusion method is a dry-extrusion method. In certain embodiments, the dry-extrusion method comprises mixing materials (e.g., the active ingredient, the attractant, and/or the binder) without additional moisture and/or liquids (e.g., water, oil, and the like) to facilitate extrusion of the material to form the composition. For example, the material to form the composition can be a substantially dry material in certain cases. For example, the material comprises moisture and/or liquids (e.g., water, oil, and the like) in an amount of less than or equal to 5 wt. %, less than or equal to 4 wt. %, less than or equal to 3 wt. %, less than or equal to 2 wt. %, or less than or equal to 1 wt. % versus the total weight of the composition in certain embodiments.

Dry-extrusion processes typically differ from wet-extrusion processes, which use water and/or moisture, along with liquid reactants, such as an oil, to facilitate the extrusion process. Such wet-extrusion processes incorporate water or (components containing water or other liquids, such as oils), which accordingly result in compositions containing relatively high amounts of moisture, oils, or other components within the final composition (e.g., greater than 5 wt. %, greater than 10 wt. %, or greater than 20 wt. % of oil) and correspondingly smaller amounts of active ingredient.

It should be understood, however, that in some embodiments, a wet-extrusion process may be used to produce a rodenticide composition. In certain embodiments, the wet-extrusion method comprises mixing materials (e.g., the active ingredient, the attractant, and/or the binder) with liquids (e.g., water, oil, and the like) to facilitate extrusion of the material to form the composition. For example, the wet-extrusion method may comprise mixing materials with an oil to facilitate extrusion of the material to form the composition. In certain embodiments, the material to form the composition is substantially moist. For example, the material can comprise moisture and/or liquids (e.g., water, oil, and the like) in an amount greater than or equal to 0.01 wt. %, greater than or equal to 1 wt. %, greater than or equal to 2 wt. %, greater than or equal to 3 wt. %, greater than or equal to 4 wt. %, greater than or equal to 5 wt. %, greater than or equal to 10 wt. %, or greater than or equal to 15 wt. % versus the total weight of the composition.

In some cases wherein a liquid is utilized during the extrusion process, the liquid may be any of a variety of suitable liquids. For example, the liquid may be water, an oil, or combinations thereof. Examples of oils include, but are not limited to, olive oil, grapeseed oil, rapeseed oil, canola oil, peanut oil, lard, palm oil, mustard oil, avocado oil, safflower oil, sesame oil, sunflower oil, cashew oil, almond oil, and soybean oil. Combinations of these and/or other oils are also possible.

In some non-limiting embodiments, the composition comprises an active ingredient, an attractant, and a liquid (e.g., an oil). For example, the composition may comprise an active ingredient (e.g., acrylate) in an amount ranging from at least 70 wt. % to less than or equal to 80 wt. % versus the total weight of the composition, an attractant in an amount of at least 20 wt. % to less than or equal to 30 wt. % versus the total weight of the composition, a binder (e.g., ethyl cellulose) in an amount ranging from greater than or equal to 0.01 wt. % to less than or equal to 1 wt. % versus the total weight of the composition, and a liquid (e.g., an oil) in amount ranging from greater than or equal to 0.01 wt. % to less than or equal to 20 wt. % versus the total weight of the composition. In certain non-limiting embodiments, the composition comprises an active ingredient, an attractant, a binder, and a liquid (e.g., an oil). For instance, the composition may comprise an active ingredient (e.g., acrylate) in an amount ranging from at least 70 wt. % to less than or equal to 80 wt. % versus the total weight of the composition, an attractant in an amount of at least 20 wt. % to less than or equal to 30 wt. % versus the total weight of the composition, a binder (e.g., ethyl cellulose) in an amount ranging from greater than or equal to 0.01 wt. % to less than or equal to 1 wt. % versus the total weight of the composition, and a liquid (e.g., an oil) in amount ranging from greater than or equal to 0.01 wt. % to less than or equal to 20 wt. % versus the total weight of the composition.

According to certain embodiments, the composition may have any of a variety of suitable cross-sectional diameters (e.g., upon extrusion). For example, the dry-extruded and/or wet-extruded composition may have a cross-sectional diameter of at least 0.5 mm, at least 1.0 mm, at least 1.5 mm, at least 2.0 mm, at least 2.5 mm, at least 3.0 mm, at least 3.5 mm, at least 4.0 mm, at least 4.5 mm, at least 5.0 mm, at least 5.5 mm, at least 6.0 mm, at least 6.5 mm, or at least 7.0 mm. In certain embodiments, the dry-extruded composition may have a cross-sectional diameter of less than 7.5 mm, less than 7.0 mm, less than 6.5 mm, 6.0 mm, less than 5.5 mm, less than 5.0 mm, less than 4.5 mm, less than 4.0 mm, less than 3.5 mm, less than 3.0 mm, less than 2.5 mm, less than 2.0 mm, less than 1.5 mm, or less than 1.0 mm. Combinations of these ranges are also possible (e.g., at least 3.0 mm and less than 6.0 mm, at least 4.5 mm and less than 5.5 mm). Other ranges are also possible. In some cases, the composition is substantially cylindrical, although other cross-sectional shapes may also be used in other cases, for example, square or rectangular.

In some embodiments, the rodenticide composition is dry-extruded and/or wet-extruded into a pellet. For instance, the rodenticide composition may be dry-extruded and/or wet-extruded into a cube shape, a disc shape, a cylinder, or the like. In some cases, the rodenticide composition is dry-extruded and/or wet-extruded into ribbon form. In certain embodiments, the ribbon form is granulated. The rodenticide composition may also take other forms in other embodiments, such as a bar, a block, and the like.

After extrusion of the material, the rodenticide composition may be packaged (e.g., for transporting the composition, selling the composition, and the like). In some embodiments, a kit contains the packaged rodenticide composition. In certain embodiments, for example, the rodenticide material is packaged in a packaging material after extrusion (e.g., dry-extrusion), such as a bag, packet, or pouch. For example, the packaging material can be a porous bag (e.g., a sachet). In some embodiments, the packaging material comprises a plastic (e.g., polyethylene) and/or a bio-based or biodegradable polymer. Examples of bio-based or biodegradable polymers include, in some embodiments, starch, cellulose, chitin, alginate, soy protein, zein, casein, wheat gluten, gelatin, triglycerides, or the like). In certain embodiments, the rodenticide material is packaged in a packaging material after extrusion (e.g., wet-extrusion), such as wax paper. Other packaging materials are also possible.

Certain embodiments are related to a method for using the rodenticide composition. According to certain embodiments, the rodenticide composition may be used to kill a rodent, such as a rat. Examples of rats include the brown rat and the black rat. According to some embodiments, the rodent is a mouse. Examples of mice include the house mouse. Other examples of rodents that may be targeted include, but are not limited to, squirrels, chipmunks, voles, or the like.

Some embodiments are related to a method of using the rodenticide. For example, a composition as discussed herein may be placed in a location suitable for consumption by a rodent. Suitable locations may include, for example, a location near rodent droppings, a location near a hole and/or structure that a rodent may fit into and/or out of, or a location near a known nesting area and/or infestation area for a rodent. In some cases, the rodenticide composition may be placed randomly in the hopes that a rodent will find and consume the composition.

In certain embodiments, after placing the rodenticide composition in a location suitable for consumption by a rodent, the rodent may consume the rodenticide composition. After consumption, the active ingredient may expand, as described herein, in the stomach of the rodent, for example, upon exposure to water, foods containing moisture, gastric acids within the stomach, etc. According to certain embodiments, the active ingredient may expand until most (e.g., 50%, 60%, 70%, 80%, 90%, etc.) of the stomach of the rodent is full with the active ingredient. In certain embodiments, upon expansion of the active ingredient in the stomach of the rodent, the rodent may not search for water and/or food. The rodent may believe that its stomach is full and accordingly does not need food or water, due to the fact that its stomach is at least partially full (e.g., with the rodenticide composition). In some embodiments, the rodent may not be capable of ingesting water and/or food, due to the fact that its stomach is already at least partially full (e.g., with the rodenticide composition).

Thus, according to certain embodiments, the composition is lethal to the rodent after consumption, i.e., the composition acts as a rodenticide by causing the death of the rodent as discussed herein, even if the composition does not necessarily directly poison the rodent (e.g., by a biological reaction with the rodent), which is unlike, for example, a nerve agent, which could also be harmful to humans or other animals, such as dogs. In some embodiments, the rodent dies within five days, within four days, within three days, within two days, or within one day after consuming the composition.

The following examples are intended to illustrate certain embodiments of the present invention, but do not exemplify the full scope of the invention.

EXAMPLE

The following examples describe rodenticide compositions and their use in accordance with one embodiment of the invention.

Rodenticide compositions comprising sodium polyacrylate, ethyl cellulose, and various attractants were manufactured according to Table 1. Sodium polyacrylate was purchased from Carolina Biological Supply. These compositions were prepared based on attraction, which is an important feature of a rodenticide composition, as rodents may only investigate a new food source a single time, and the attractant must be powerful enough to entice the rodents.

TABLE 1

Manufactured rodenticide compositions.

| Sample | Active Ingredient | Active Ingredient (%) | Attractant | Attractant (%) | Binder | Binder (%) |
|---|---|---|---|---|---|---|
| 1 | sodium polyacrylate | 50 | cherry | 49.99 | ethyl cellulose | 0.01 |
| 2 | sodium polyacrylate | 70 | maple | 29.99 | ethyl cellulose | 0.01 |
| 3 | sodium polyacrylate | 70 | raspberry | 29.99 | ethyl cellulose | 0.01 |
| 4 | sodium polyacrylate | 70 | mackerel | 29.99 | ethyl cellulose | 0.01 |

The rodenticide compositions were manufactured using a dry-extrusion method to limit additional ingredients needed during manufacturing. A wet-extrusion method requires an oil type binding agent, and the effectiveness of such products may be reduced. The dry-extrusion method used either a screw compression extruder that was hand powered or a hand-crank compression dry pellet machine. The compositions were dry-extruded into cylindrical pellets using the extruders. The weight of the pellets were 0.05 gram, on average. The average height of the pellet was 10 mm, and the diameter was 5 mm.

The rodenticide compositions were tested with mice that were acquired locally and weighed (average of 0.7 ounces, each, wherein 1 ounce is 28.35 g). The testing environment used a plastic crate with a closed top, and bulk padded nesting paper was used as bedding in order to allow mice to rest comfortably. The dimensions of the crate were 18 inches wide, 32 inches long, and 22 inches high (1 inch is 2.54 cm). A source of water was added to the plastic crate in a raised dish to prevent tipping. The water was measured out in three ounces per dish. The plastic crate could be opened or closed and lights were turned either on or off to simulate twelve hours of light and twelve hours of darkness, which is the life cycle that the mice typically live in. One of each mouse was placed in the crate, along with water, and between 4-6 pellets of each sample. The actions/reactions of the mice were observed over time.

For sample 1, the mouse did not react to the cherry flavor on day one. By day two, however, the mouse had eaten all four pellets. Five more pellets were added, of which the mouse ate two on day three. The mouse was dead in the morning of day four, after approximately 80 hours. The mouse died on the drinking bowl.

Three separate trials were ran for each sample 2-4. All nine of the mice (three per sample) died between 48 and 60 hours, and seven out of nine mice died within a short distance of the water dish, showing an interest in water before time of death. Separate trials of sample 2-4 were conducted with larger mice (over 3 ounces) to simulate a wild mouse and/or rat. All of the larger mice died within 48 to 60 hours. Thus, for samples 2-4, the mice died relatively quickly, after consuming pellets with a higher amount of active ingredient. In contrast, for sample 1, the mouse lived longer before dying after eating a pellet with a lower amount of active ingredient.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition for killing a rodent, consisting of:
   an active ingredient in an amount ranging from at least 60 wt. % to less than or equal to 75 wt. % versus the total weight of the composition, wherein the active ingredient comprises polyacrylate and expands by at least its original size upon exposure to water;
   an attractant in an amount ranging from at least 20 wt. % to less than or equal to 40 wt. % versus the total weight of the composition; and
   a binder in an amount ranging from at least 0.01 wt. % to less than or equal to 10 wt. % versus the total weight of the composition, wherein the binder comprises ethyl cellulose, wherein the composition is lethal to the rodent after consumption.

2. The composition for killing a rodent of claim 1, wherein the attractant comprises one or more attractants selected from the group consisting of peanut butter, salt, bonito, mackerel, oyster, lobster, clam, fruit punch, maple, pineapple, apple, berry, berry punch, strawberry, raspberry, fish, rotten fruit, cheese, corn, soy oil, soybean, chicken feed, cracked corn, and distillers grain.

3. The composition for killing a rodent of claim 1, wherein the composition expands at least 400 vol. % upon exposure to water.

4. The composition for killing a rodent of claim 1, wherein the active ingredient is present in an amount of at least 60 wt. % to less than or equal to 70 wt. % versus the total weight of the composition.

5. The composition for killing a rodent of claim 1, wherein the attractant is present in an amount of:
- (a) at least 30 wt. % to less than or equal to 40 wt. % versus the total weight of the composition; or
- (b) at least 20 wt. % to less than or equal to 30 wt. % versus the total weight of the composition.

6. The composition for killing a rodent according to claim 1, wherein the composition is in the form of:
- (a) a pellet; or
- (b) a cube or a disc.

7. A method for killing a rodent, comprising:
placing the composition of claim 1 in a location suitable for consumption by a rodent.

8. The method according to claim 7, wherein:
- (a) the rodent dies within three days after consuming the composition; or
- (b) the rodent dies within two days after consuming the composition.

9. The method according to claim 7, wherein:
- (a) the rodent is a rat; or
- (b) the rodent is a mouse.

10. A method for making a rodenticide composition comprising:
dry-extruding the composition of claim 1.

* * * * *